United States Patent
Fukuda et al.

(10) Patent No.: US 12,442,505 B2
(45) Date of Patent: Oct. 14, 2025

(54) VEHICLE LAMP

(71) Applicant: Stanley Electric Co., Ltd., Tokyo (JP)

(72) Inventors: Shohei Fukuda, Tokyo (JP); Naganori Inagaki, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 18/855,988

(22) PCT Filed: Apr. 11, 2023

(86) PCT No.: PCT/JP2023/014671
§ 371 (c)(1),
(2) Date: Oct. 10, 2024

(87) PCT Pub. No.: WO2023/204097
PCT Pub. Date: Oct. 26, 2023

(65) Prior Publication Data
US 2025/0230915 A1     Jul. 17, 2025

(30) Foreign Application Priority Data
Apr. 20, 2022 (JP) .................. 2022-069359

(51) Int. Cl.
*F21S 43/241* (2018.01)
(52) U.S. Cl.
CPC .................. *F21S 43/241* (2018.01)
(58) Field of Classification Search
CPC ........ F21S 43/245; F21S 43/241; F21S 43/14; F21S 43/249; F21S 8/10
See application file for complete search history.

(56) References Cited

U.S. PATENT DOCUMENTS

2019/0187359 A1* 6/2019 Ohtawa ................. G02B 6/0038
2020/0018457 A1* 1/2020 Enomoto ................ F21S 43/40

FOREIGN PATENT DOCUMENTS

JP  2013-191403 A  9/2013
JP  2015-053147 A  3/2015
(Continued)

OTHER PUBLICATIONS

Innovation Q+ NPL Search (Year: 2024).*
International Search Report for PCT/JP2023/014671 dated May 23, 2023.

*Primary Examiner* — Anabel Ton
(74) *Attorney, Agent, or Firm* — KENEALY VAIDYA LLP (57) ABSTRACT

A light-guide-body of a vehicle lamp has a first-light-guide-part, a first-incidence-part located on a base end side of the first-light-guide-part, a plurality of first-reflection-cuts located on a back surface side of the first-light-guide-part, a light-emitting-part located on a front surface side of the first-light-guide-part, a second-light-guide-part obliquely connected to the back surface side of the first-light-guide-part in a direction facing a tip side of the first-light-guide-part, a second-incidence-part located on a base end side of the second-light-guide-part, an opening-part located between the second-light-guide-parts and the back surface side of the first-light-guide-part, and a light guide output part located on a side of the second-light-guide-part which faces the back surface side of the first-light-guide-part across the opening-part, and a plurality of second reflection cuts is provided on a back surface side of the first-light-guide-part which is across the opening-part.

7 Claims, 6 Drawing Sheets

(56) References Cited

FOREIGN PATENT DOCUMENTS

| JP | 2016-212988 A | 12/2016 | |
| WO | WO-2022025181 A1 * | 2/2022 | ............. B60Q 1/381 |
| WO | WO-2024014312 A1 * | 1/2024 | |

* cited by examiner

VEHICLE LAMP

This application is a U.S. National Stage Application under 35 U.S.C § 371 of International Patent Application No. PCT/JP2023/014671 filed Apr. 11, 2023, which claims the benefit of priority under 35 U.S.C. § 119 to Japanese Patent Application No. 2022-069359 filed Apr. 20, 2022, the disclosures of all of which are hereby incorporated by reference in their entireties.

TECHNICAL FIELD

The present invention relates to a vehicle lamp.

BACKGROUND ART

In the related art, as a vehicle lamp mounted on a vehicle, there is known a configuration in which a light source such as a light emitting diode (LED) or the like and a rod-shaped light guide body (a light guide rod) are combined (for example, see the following Patent Document 1).

In such a vehicle lamp, light emitted from the light source enters the light guide body from an incidence part provided on a base end side of the light guide body, and the light is guided toward a tip side of the light guide body while repeating reflection in the light guide body. In addition, the light reflected by a plurality of reflection cuts provided on a back surface side of the light guide body is emitted to the outside of the light guide body from a front surface side of the light guide body. Accordingly, it is possible to emit light from the light emitting part provided on the front surface side of the light guide body in a linear shape.

CITATION LIST

Patent Document

Patent Document 1: Japanese Unexamined Patent Application, First Publication No. 2016-212988

SUMMARY OF INVENTION

Technical Problem to be Solved

Incidentally, in recent years, with the diversification of vehicle lamp designs, there has been an increase in designs that use linear-shaped emission for, for example, direction indicators (winker lamps, turn lamps), width indicators (position lamps), daytime running lamps (DRLs), or the like.

However, in the above-mentioned rod-shaped light guide body, differences in the optical path length of the light guided from the base end side to the tip side could cause luminance unevenness in the light emitting part. That is, when luminance unevenness occurs in the light emitting part of the light guide body, in the axial direction of the light guide body, a tip side, which has a longer optical path length from the light source, becomes relatively darker due to light attenuation than a base end side, which has a shorter optical path length from the light source. Accordingly, this type of light and dark luminance is perceived as uneven luminance in the light emitting part.

For this reason, when the rod-shaped light guide body emits light in a linear shape, the occurrence of the luminance unevenness mentioned above has led to problems such as deterioration in the lighting feeling, for example, a decrease in visibility and appearance of the light emitting part.

Therefore, in the invention disclosed in the above-mentioned Patent Document 1, in addition to the incidence part provided on the base end side of the above-mentioned light guide body, a light guide part connected obliquely in a direction toward the tip side of the light guide body is provided on the back surface side of the light guide body, and light emitted from another light source is made to enter from the incidence part provided on the base end side of this light guide part. Accordingly, even when the light guide body is long, it is possible to guide sufficient light from the base end side toward the tip side of the light guide body.

However, when the light guide part is connected to a back surface side of the light guide body, the above-mentioned plurality of reflection cuts cannot be provided on a portion to which the light guide part is connected. For this reason, this results in a dark area (emission unevenness) in which the area where the light guide part is connected is darker than other areas. Accordingly, also in this case, it becomes difficult to make the light emitting part of the long light guide body emit light more uniformly.

An aspect of the present invention is directed to providing a vehicle lamp capable of more uniform emission from a light emitting part of a long light guide body.

Solution to Solve Problem

An aspect of the present invention provides the following configurations.

(1) A vehicle lamp including:
    a first light source and a second light source; and
    a light guide body configured to guide light emitted from the first light source and the second light source,
    wherein the light guide body has:
    a rod-shaped first light guide part;
    a first incidence part that is located on a base end side of the first light guide part and that is configured to cause the light emitted from the first light source to enter the first light guide part;
    a plurality of first reflection cuts that is located on a back surface side of the first light guide part and that is configured to reflect the light guided toward a tip side of the first light guide part toward a front surface side of the first light guide part;
    a light emitting part that is located on the front surface side of the first light guide part and that is configured to emit the light reflected by the plurality of first reflection cuts to an outside of the first light guide part;
    a second light guide part obliquely connected to the back surface side of the first light guide part via a connecting part in a direction toward the tip side of the first light guide part;
    a second incidence part that is located on a base end side of the second light guide part and that is configured to cause the light emitted from the second light source to enter the second light guide part;
    an opening part that is located between the second light guide part and the back surface side of the first light guide part and that is configured to form an air layer; and a light guide output part that is located on a side of the second light guide part which faces the back surface side of the first light guide part across the opening part and that is configured to emit the light guided toward the tip side of the second light guide part to the air layer, and a plurality of second reflection cuts is provided on the back surface side of the first light guide part which is across the opening part.

(2) The vehicle lamp according to the above-mentioned (1), wherein, among the light which has been emitted from the light guide output part to the air layer and which has entered the first light guide part from the back surface side of the first light guide part which is across the opening part, some light is guided toward the tip side of the first light guide part, and some light is emitted from the front surface side of the first light guide part to the outside of the first light guide part.

(3) The vehicle lamp according to the above-mentioned (1), wherein the second incidence part, the second reflection cut and the light emitting part are arranged on an optical path of the light emitted from the second light source.

(4) The vehicle lamp according to any one of the above-mentioned (1) to (3), wherein the light guide output part includes a light guide emitting surface inclined obliquely with respect to an axial direction of the second light guide part to be parallel to an axial direction of the first light guide part.

(5) The vehicle lamp according to any one of the above-mentioned (1) to (3), wherein the light guide output part includes a light guide emitting surface perpendicular with respect to the axial direction of the second light guide part.

(6) The vehicle lamp according to any one of the above-mentioned (1) to (3), wherein the connecting part connects the back surface side of the first light guide part and the tip side of the second light guide part via a pair of connecting parts located on both sides across the opening part.

(7) The vehicle lamp according to the above-mentioned (6), wherein, among the light emitted from the light guide output part to the air layer, some light that has been reflected by the pair of connecting parts enters the first light guide part from the back surface side of the first light guide part which is across the opening part.

Advantageous Effects of Invention

According to the aspect of the present invention, it is possible to provide a vehicle lamp capable of more uniform emission from a light emitting part of a long light guide body.

DESCRIPTION OF EMBODIMENTS

Hereinafter, an embodiment of the present invention will be described with reference to the accompanying drawings.

Further, in the drawings used in the following description, in order to make each component easier to see, dimensions of each component may be shown at different scales, and dimensional ratios of each component may not necessarily be the same as the actual ones.

As the embodiment of the present invention, for example, a vehicle lamp 1 shown in FIG. 1 to FIG. 6 will be described.

Figure 1:
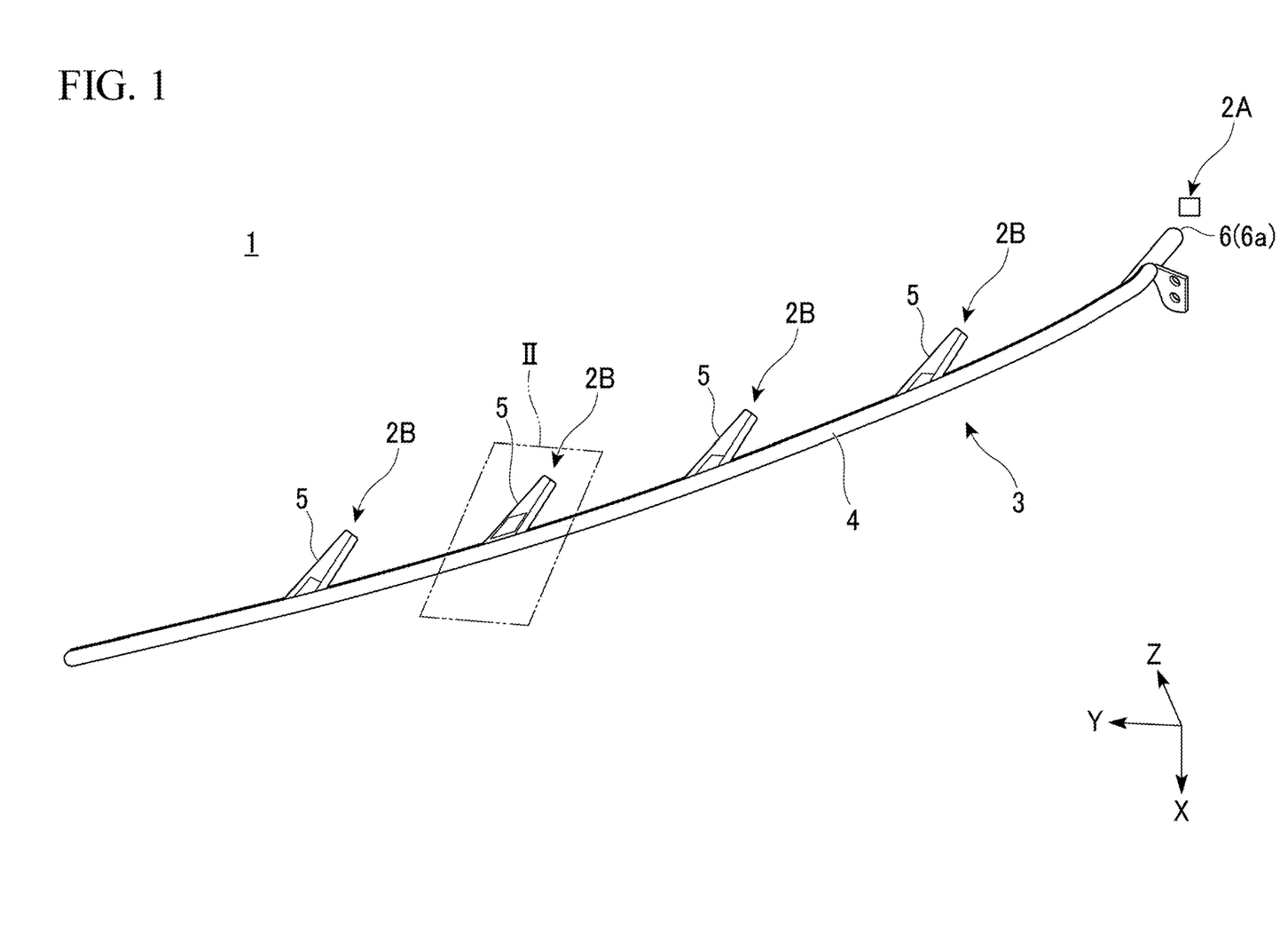
FIG. 1 is a perspective view showing a configuration of a vehicle lamp according to an embodiment of the present invention.
Figure 2:
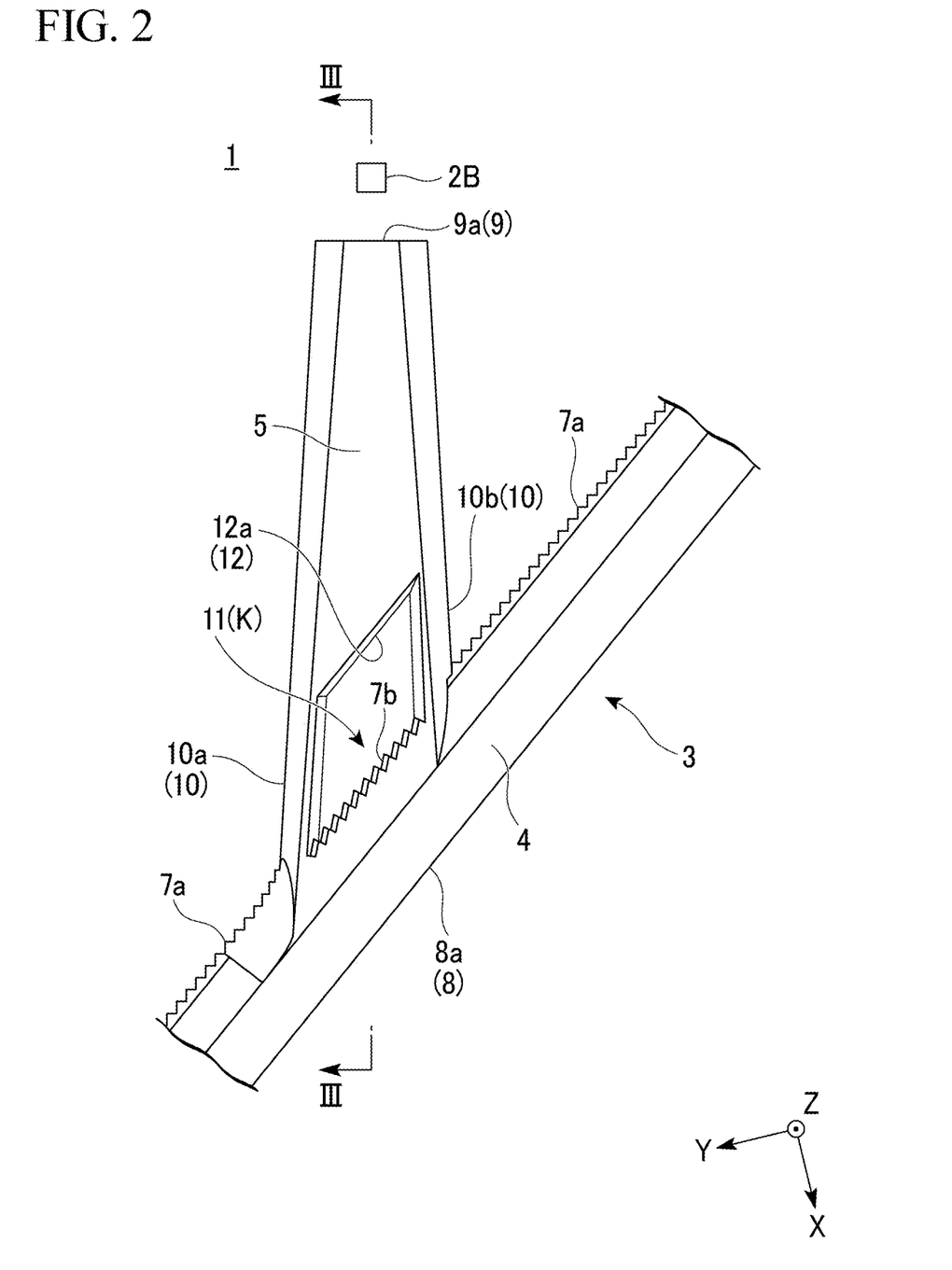
FIG. 2 is a plan view of the vehicle lamp, an enclosed portion II shown in FIG. 1 being enlarged.
Figure 3:
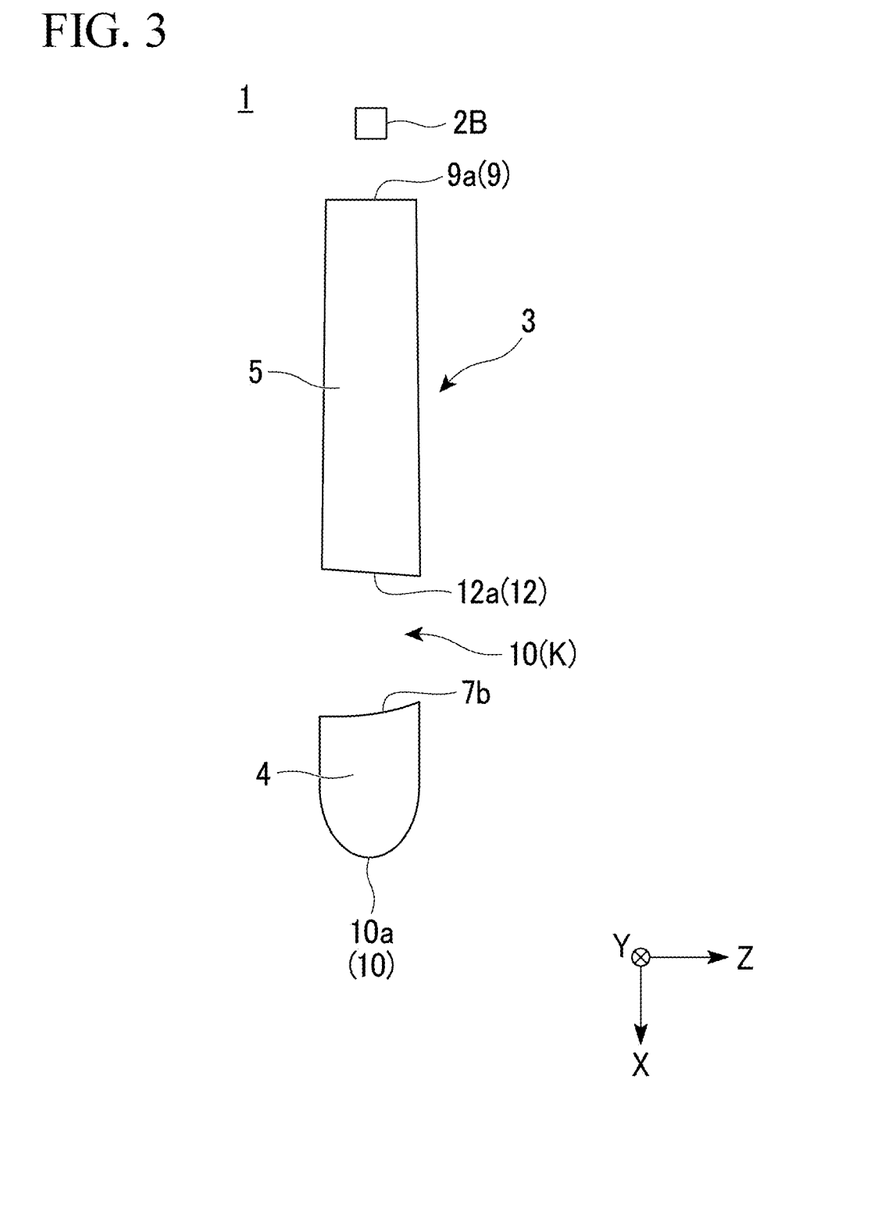
FIG. 3 is a cross-sectional view of the vehicle lamp along line segment III-III shown in FIG. 2.
Figure 4:
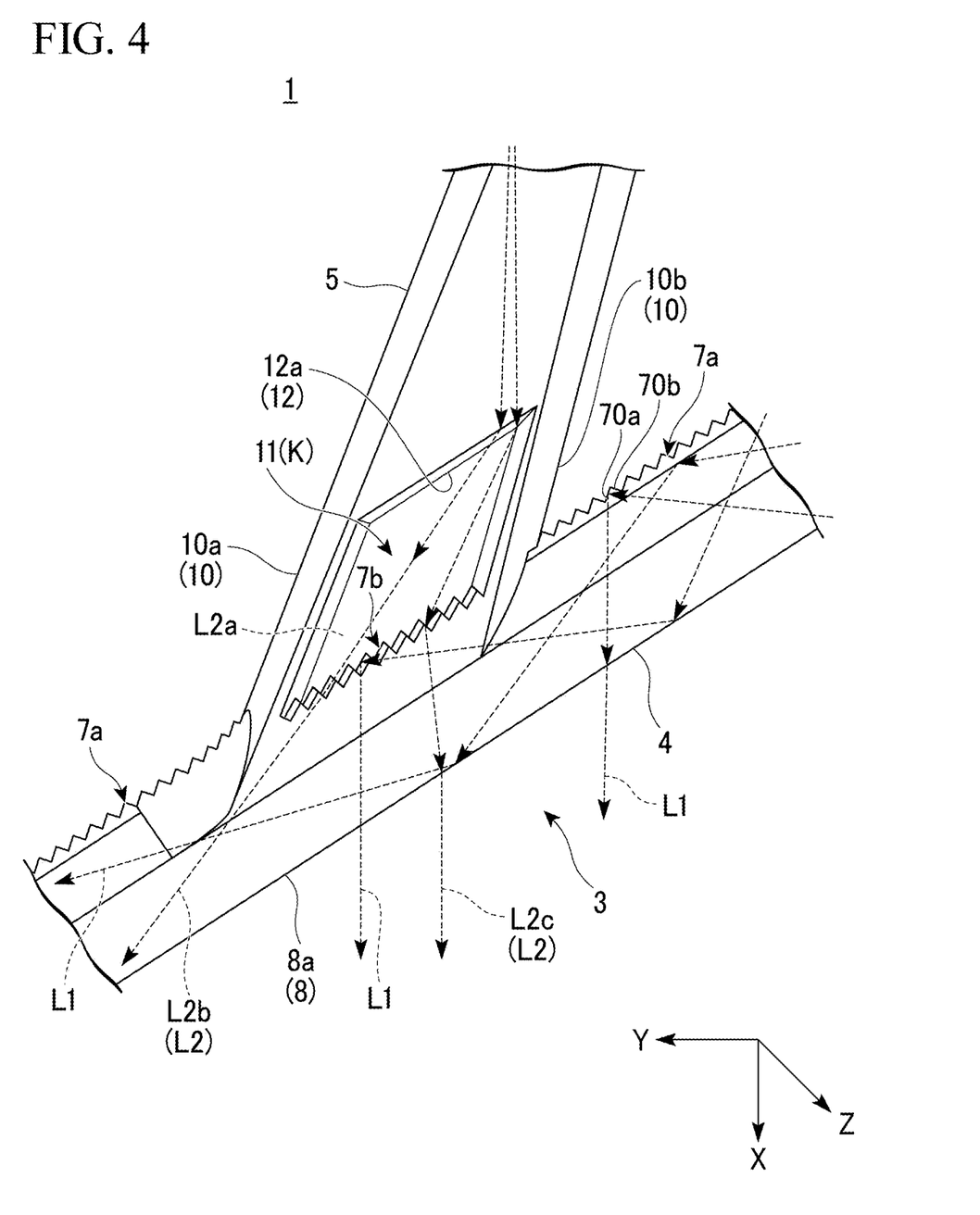
FIG. 4 is a perspective view showing an optical path of light of the vehicle lamp shown in FIG. 2.
Figure 5:
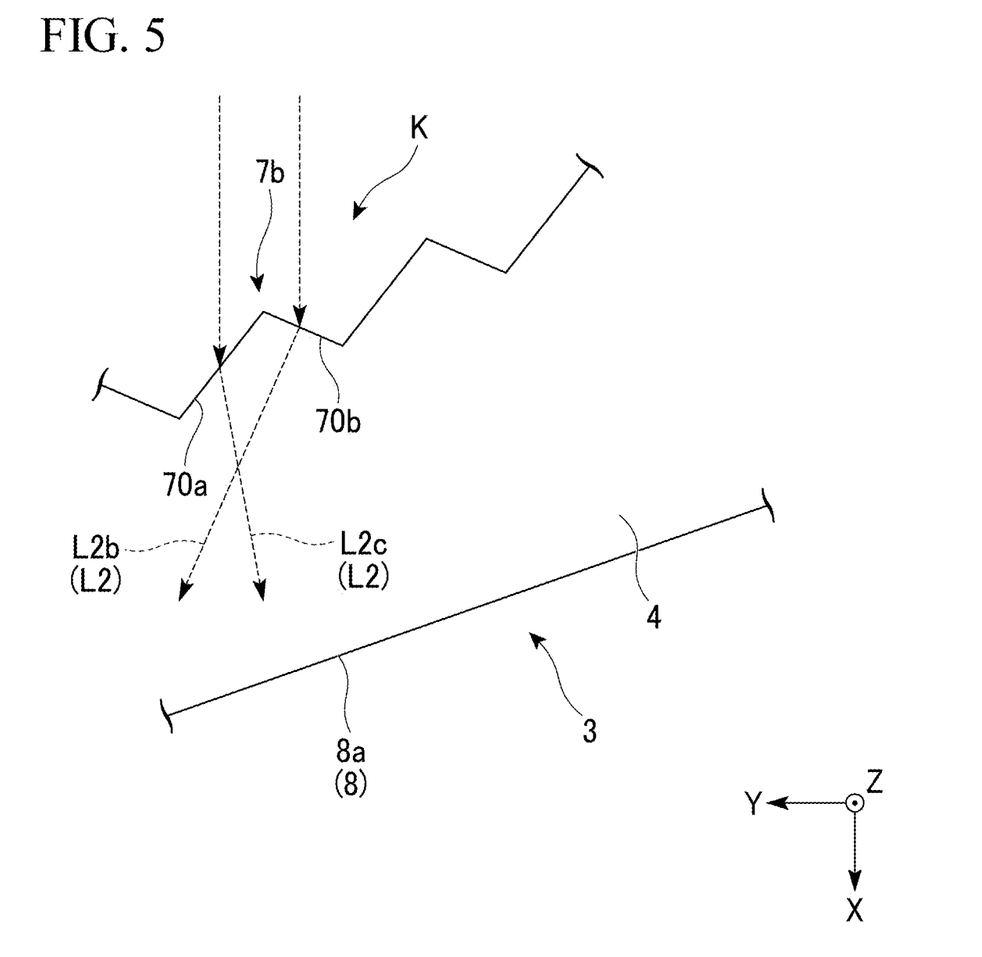
FIG. 5 is a partially enlarged cross-sectional view showing an optical path of light entering a back surface side of a first light guide part with an opening part shown in FIG. 4 interposed therebetween.
Figure 6:
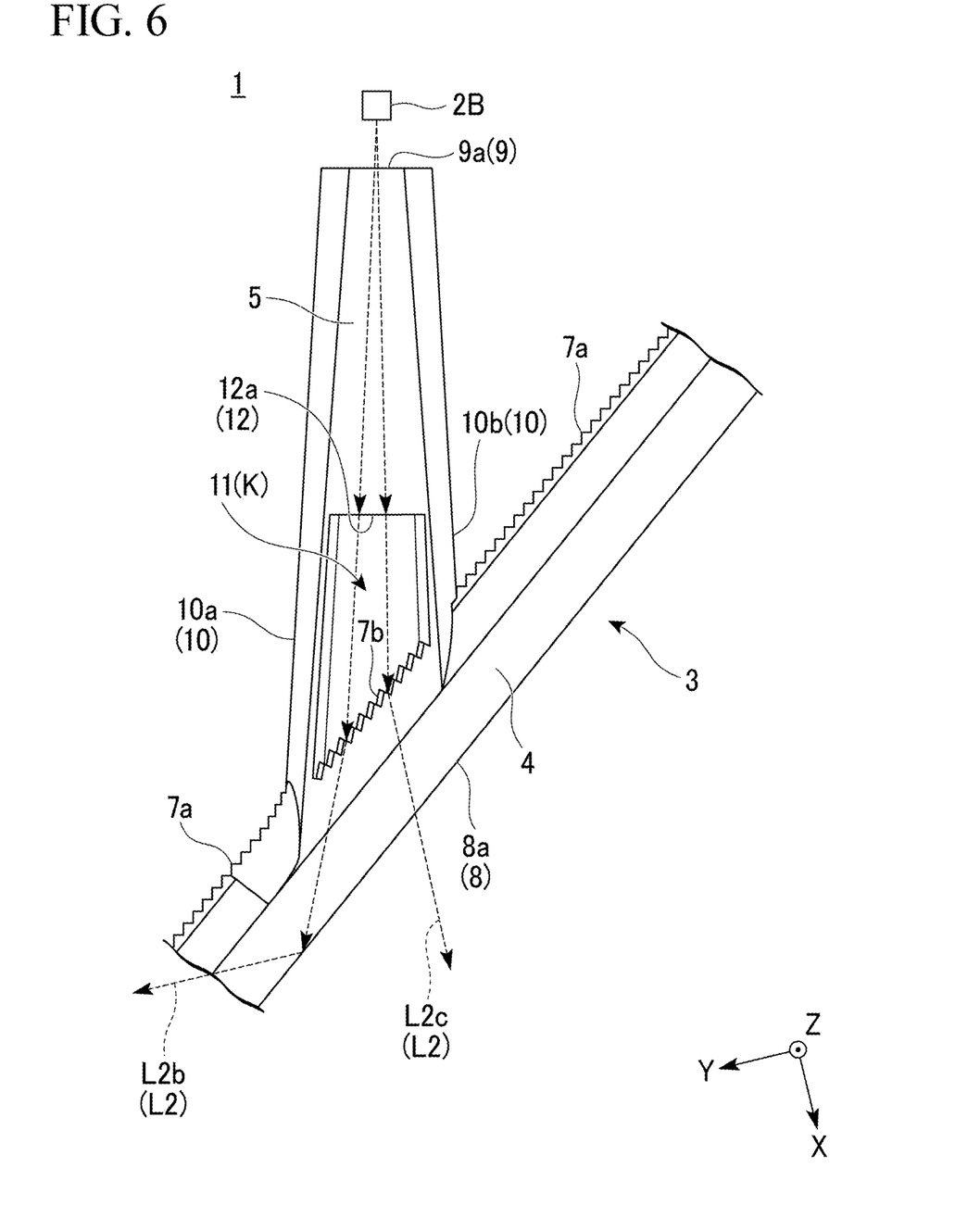
FIG. 6 is a plan view showing another shape of the opening part shown in FIG. 2.

Further, FIG. 1 is a perspective view showing a configuration of the vehicle lamp 1. FIG. 2 is a plan view of the vehicle lamp 1, an enclosed portion II shown in FIG. 1 being enlarged. FIG. 3 is a cross-sectional view of the vehicle lamp 1 along line segment III-III shown in FIG. 2. FIG. 4 is a perspective view showing optical paths of light L1 and L2 of the vehicle lamp 1. FIG. 5 is a partially enlarged cross-sectional view showing optical paths of light L2b and L2c entering a back surface side of a first light guide part 4 with an opening part 11 interposed therebetween. FIG. 6 is a plan view showing another shape of the opening part 11.

In addition, in the drawings described below, an XYZ orthogonal coordinate system is set, an X-axis direction indicates a forward/rearward direction (a lengthwise direction) of the vehicle lamp 1, a Y-axis direction indicates a leftward/rightward direction (a widthwise direction) of the vehicle lamp 1, and a Z-axis direction indicates an upward/downward direction (a height direction) of the vehicle lamp 1.

The vehicle lamp 1 of the embodiment includes a first light source 2A, a plurality of (in the embodiment, four) second light sources 2B, and a light guide body 3 configured to guide the light L1 and L2 emitted from the first light source 2A and the plurality of second light sources 2B.

The first light source 2A and the second light sources 2B, for example, constituted by LEDs, are mounted on a surface of a circuit board (not shown) on which a driving circuit configured to drive the LEDs is provided, and radially emit the light L1 and L2 toward a front surface side of the vehicle lamp 1.

The light guide body 3 is constituted by a light transmitting member formed of a transparent resin such as polycarbonate, acryl, or the like, glass, or the like, and has the rod-shaped first light guide part 4, and a plurality of (in the embodiment, four) second light guide parts 5 connected to a back surface side of the first light guide part 4.

The first light guide part 4 extends in a vehicle width direction and has an elongated shape that is curved or inclined in a direction receding on the outside with respect to the inside in the vehicle widthwise direction in accordance with a slant shape given to corner parts on a front end or rear end side of the vehicle.

The plurality of second light guide parts 5 are disposed side by side at predetermined intervals in the axial direction of the first light guide part 4, and obliquely connected to a back surface side of the first light guide part 4 in a direction facing the tip side of the first light guide part 4. Each of the second light guide parts 5 has a long plate shape with a width that gradually increases from the base end (rear end) side toward the tip (front end) side.

The light guide body 3 has a first incidence part 6 located on a base end side of the first light guide part 4, a plurality of first reflection cuts 7a located on a back surface side of the first light guide part 4, a light emitting part 8 located on a front surface side of the first light guide part 4, and a second incidence part 9 located on a base end side of each of the second light guide parts 5.

The first incidence part 6 has a flat (planar) first incidence surface 6a located on a base end side of the first light guide part 4 and facing the first light source 2A. In the first incidence part 6, the light L1 emitted from the first light source 2A enters the first light guide part 4 from the first incidence surface 6a. Accordingly, the light L1 entering from the first incidence surface 6a (the first incidence part 6) is guided toward the tip side of the first light guide part 4 while repeating reflection in the first light guide part 4.

Further, the first incidence part 6 is not limited to a configuration having the above-mentioned flat (planar) first incidence surface 6a, and may be configured to have a lens shape that collimates or focuses the light L1 radially emitted from the first light source 2A and causes the light L1 to enter the first light guide part 4.

The plurality of first reflection cuts 7a need only reflect the light L1 and L2 entering the back surface side of the first light guide part 4 at an angle that causes the light L1 and L2 to emit (transmit) from the front surface side of the first light guide part 4 to the outside, and there are no particular limitations on their shapes, sizes, numbers, or the like.

In the embodiment, for example, the first reflection cuts 7a, which have approximately triangular cross sections obtained by cutting the back surface of the first light guide part 4 in a vertical direction (upward/downward direction in this embodiment) perpendicular to the axial direction of the first light guide part 4, are aligned in the axial direction of the first light guide part 4 (the leftward/rightward direction in this embodiment).

Each of the first reflection cuts 7a has a first inclined surface 70a and a second inclined surface 70b, which are inclined in opposite directions. The first inclined surface 70a is inclined obliquely toward the tip side of the first light guide part 4. Meanwhile, the second inclined surface 70b is inclined obliquely toward the base end side of the first light guide part 4. In addition, the first inclined surface 70a is more gently inclined than the second inclined surface 70b and is longer than the second inclined surface 70b.

In addition, in the embodiment, the intervals between the adjacent first reflection cuts 7a are equal. Meanwhile, in order to more uniformly emit the light from the light emitting part 8 described below, the interval between the adjacent first reflection cuts 7a may be gradually narrowed from the base end side toward the tip side of the first light guide part 4 (between the adjacent second light guide parts 5), or the depth of the groove parts forming the first reflection cuts 7a may be gradually deepened.

The light emitting part 8 is located on the front surface side of the first light guide part 4 and has an emitting surface 8a that is continuous with the first light guide part 4 in the axial direction. The emitting surface 8a is formed by a convex curved surface curved like an arc shape in the vertical cross section of the first light guide part 4. In the light emitting part 8, the light L1 and L2 are emitted from the emitting surface 8a to the outside.

Further, the emitting surface 8a may be configured to have a plurality of diffusion cuts (not shown) configured to diffuse the light L1 and L2 emitted from the emitting surface 8a to the outside. Examples of the diffusion cuts include lens cuts called flute cuts, fish eye cuts, or the like, and uneven structures formed by applying knurling, embossing, or the like. In addition, by adjusting the shape or the like of the diffusion cuts, it is possible to control the degree of diffusion of the light L1 and L2 emitted from the emitting surface 8a. In addition, a configuration in which another diffusion lens is disposed on the front surface side of the emitting surface 8a may also be used.

The second incidence part 9 has a flat (planar) second incidence surface 9a located on the base end side of the second light guide parts 5 and facing the second light sources 2B. In the second incidence part 9, the light L2 emitted from the second light sources 2B enters the second light guide parts 5 from the second incidence surface 9a. Accordingly, the light L2 entering from the second incidence surface 9a (the second incidence part 9) is guided toward the tip side of the first light guide part 4 while repeating reflection in the second light guide parts 5.

The light guide body 3 has a connecting part 10 configured to connect the first light guide part 4 and the second light guide part 5, the opening part 11 located between the back surface side of the first light guide part 4 and the second light guide part 5, and a light guide output part 12 located on a side of the second light guide part 5 facing the back surface side of the first light guide part 4 while having the opening part 11 interposed between the light guide output part 12 and the back surface side of the first light guide part 4.

The connecting part 10 connects the back surface side of the first light guide part 4 and the tip side of the second light guide part 5 via a pair of connecting parts 10a and 10b located on both sides in the widthwise direction having the opening part 11 interposed therebetween.

The opening part 11 is constituted by a concave portion or a hole portion (in this embodiment, a hole portion) that forms an air layer K between the back surface side of the first light guide part 4 and the second light guide part 5.

The light guide output part 12 is constituted by a surface (hereinafter, referred to as "a light guide emitting surface") 12a of the second light guide part 5 which is facing the back surface side of the first light guide part 4 while having the opening part 11 interposed between the surface 12a and the back surface side of the first light guide part 4. In addition, the light guide emitting surface 12a is inclined obliquely with respect to the axial direction of the second light guide part 5 so as to be parallel to the axial direction of the first light guide part 4. That is, the light guide emitting surface 12a is inclined obliquely in a direction directed toward the tip side of the first light guide part 4 along with the inclination of the back surface side of the first light guide part 4 which is across the opening part 11.

In the light guide output part 12, the light L2 guided toward the tip side of the second light guide part 5 is emitted from the light guide emitting surface 12a to the air layer K. Accordingly, the light L2 emitted to the air layer K enters the first light guide part 4 from the back surface side of the first light guide part 4 which is across the opening part 11.

In addition, light L2a, which is some of the light L2 emitted to the air layer K, is reflected by the connecting parts 10a and 10b, and enters the first light guide part 4 from the back surface side of the first light guide part 4 which is across the opening part 11.

A plurality of second reflection cuts 7b having the same shape (the first inclined surface 70a and the second inclined surface 70b) as the first reflection cuts 7a are provided on the back surface side of the first light guide part 4 which is across the opening part 11.

The second reflection cuts 7b have basically the same shape as the first reflection cuts 7a described above, but their shapes, sizes, numbers, or the like, can be modified as appropriate.

Accordingly, among the light L entering the first light guide part 4 from the back surface side of the first light guide part 4 which is across the opening part 11, some light L2b entering the second inclined surfaces 70b of the second reflection cuts 7b is guided toward the tip side of the first light guide part 4. Meanwhile, some light L2c entering the first inclined surfaces 70a of the second reflection cuts 7b is emitted from the front surface side of the first light guide part 4 to the outside of the first light guide part 4. Further, in the embodiment, in addition to the light L2b and L2c mentioned above, depending on the angle of the light L2 entering the second reflection cuts 7b, the light L2 may travel in a direction different from the above-mentioned directions.

In the vehicle lamp 1 of the embodiment, the second incidence part 9, the second reflection cuts 7b and the light emitting part 8 are arranged on an optical path of the light L2 emitted from the second light sources 2B. The opening part 11 is provided on the optical path of the light L2 emitted from the second light sources 2B.

In this case, the some light L2c entering from the second incidence part 9 and entering the first light guide part 4 via the air layer K of the opening part 11 is emitted from the light emitting part 8 located on the front surface side of the first light guide part 4.

Further, although the shape of the opening part 11 is not particularly limited, a relationship between the light guide emitting surface 12a and the base surface of the second reflection cuts 7b needs only to establish the optical path of the light L2c described above.

As described above, in the vehicle lamp 1 of the embodiment, even when the second light guide part 5 is connected to the back surface side of the first light guide part 4, by providing the plurality of second reflection cuts 7b on the back surface side of the first light guide part 4 which is across the opening part 11, it is possible to prevent occurrence of a dark area (emission unevenness) in which the light emitting part 8 in the portion to which the second light guide part 5 is connected gets darker than the other portions in the light emitting part 8.

In addition, in the vehicle lamp 1 of the embodiment, even when the first light guide part 4 is long, by connecting the second light guide part 5 to the back surface side of the first light guide part 4 and causing the light L emitted from the second light source 2B to enter the second incidence part provided on the base end side of the second light guide part, it is possible to guide sufficient amounts of the lights L1 and L2 from the base end side toward the tip side of the first light guide part 4.

In addition, in the vehicle lamp 1 of the embodiment, by providing the opening part 11 on the tip side of the second light guide part 5 which is connected to the first light guide part 4, it is possible to additionally form a base surface on which the second reflection cuts 7b are provided on the first light guide part 4.

Accordingly, the lights L1 and L2 entering and guided through the first incidence part 6 and the second incidence part 9 which is located behind are able to hit the second reflection cuts 7b, and some of the light can be guided to the tip side of the first light guide part 4 and some of the light can be emitted from the light emitting part 8. In this way, it is possible to give an edge formed on the body of the first light guide part 4 of the opening part 11 two optical effects: internal light guiding and front emission.

In addition, in the vehicle lamp 1 of the embodiment, by providing the light guide emitting surface 12a facing the base surface of the second reflection cuts 7b, it is possible to form the base surface of the second reflection cuts 7b while forming a surface that receives the light L2 entering from the second incidence part 9 of the second light guide part 5.

In this way, in the vehicle lamp 1 of the embodiment, it is possible to make the light emitting part 8 of the long light guide body 3 emit light more uniformly and brightly.

Further, the present invention is not necessarily limited to the above-mentioned embodiment, and various modifications may be made without departing from the scope of the present invention.

For example, as for the opening part 11, as shown in FIG. 2 above, the light guide emitting surface 12a is configured to be inclined obliquely toward the tip side of the first light guide part 4, but for example, as shown in FIG. 6, the light guide emitting surface 12a may be configured to be perpendicular to the axial direction of the second light guide part 5.

That is, the light guide emitting surface 12a and the base surface of the second reflection cuts 7b may be parallel, or the light guide emitting surface 12a and the base surface of the second reflection cuts 7b may be arranged to form a predetermined angle so that the light L2 entering the second reflection cuts 7b becomes at a specific angle.

In this way, by changing the inclination of the light guide emitting surface 12a, it is possible to adjust a ratio of the light L2b and the light L2c that has entered the first light guide part 4 via the back surface side of the first light guide part 4.

In addition, regarding the light guide body 3, it is also possible to omit the first incidence part 6 located on the base end side of the first light guide part 4 and configure the light guide body 3 with only the second incidence part 9. In this case, the second incidence part 9, which is located on the most end side of the first light guide part 4, corresponds to the first incidence part.

In addition, in the vehicle lamp 1, the shape and length of the light guide body 3 and the shape and number of the second light sources 2B (second light guide part) can be appropriately changed according to the design of the actual vehicle.

Further, the vehicle lamps to which the present invention is applicable are not particularly limited, and the present invention can be widely applied to, for example, taillights (tail lamps), width indicators (position lamps), daytime running lights (DRLs), back lamps, direction indicators (turn lamps, winker lamps), side marker lamps, or the like.

In particular, when the vehicle lamp 1 is applied to the turn lamp, it is also possible to perform sequential emission in which a flow of emission is produced in the vehicle width direction in the light emitting part 8 of the first light guide part 4 while sequentially lighting the plurality of second light sources 2B.

In addition, the above-mentioned first and second light sources 2A and 2B need only be capable of radially emitting the light L1 and L2, and in addition to the above-mentioned LEDs, light emitting elements such as laser diodes (LDs) can also be used. In addition, the color of the light emitted by the first and second light sources 2A and 2B can be changed appropriately depending on the use of the vehicle lamp 1, such as red light, white light, orange light, or the like.

REFERENCE SIGNS LIST

1 Vehicle lamp
2A First light source
2B Second light source
4 First light guide part
5 Second light guide part
6 First incidence part
7a First reflection cut
7b Second reflection cut
8 Light emitting part 9 Second incidence part
10 Connecting part
10a, 10b Connecting part
11 Opening part
12 Light guide output part
K Air layer
L1, L2 Light

The invention claimed is:

1. A vehicle lamp comprising:
a first light source and a second light source; and
a light guide body configured to guide light emitted from the first light source and the second light source,
wherein the light guide body has:
a rod-shaped first light guide part;
a first incidence part that is located on a base end side of the first light guide part and that is configured to cause the light emitted from the first light source to enter the first light guide part;
a plurality of first reflection cuts that is located on a back surface side of the first light guide part and that is configured to reflect the light guided toward a tip side of the first light guide part toward a front surface side of the first light guide part;
a light emitting part that is located on the front surface side of the first light guide part and that is configured to emit the light reflected by the plurality of first reflection cuts to an outside of the first light guide part;
a second light guide part obliquely connected to the back surface side of the first light guide part via a connecting part in a direction toward the tip side of the first light guide part;
a second incidence part that is located on a base end side of the second light guide part and that is configured to cause the light emitted from the second light source to enter the second light guide part;
an opening part that is located between the second light guide part and the back surface side of the first light guide part and that is configured to form an air layer; and
a light guide output part that is located on a side of the second light guide part which faces the back surface side of the first light guide part across the opening part and that is configured to emit the light guided toward the tip side of the second light guide part to the air layer, and
a plurality of second reflection cuts is provided on the back surface side of the first light guide part which is across the opening part.

2. The vehicle lamp according to claim 1, wherein, among the light which has been emitted from the light guide output part to the air layer and which has entered the first light guide part from the back surface side of the first light guide part which is across the opening part, some light is guided toward the tip side of the first light guide part, and some light is emitted from the front surface side of the first light guide part to the outside of the first light guide part.

3. The vehicle lamp according to claim 1, wherein the second incidence part, the second reflection cut and the light emitting part are arranged on an optical path of the light emitted from the second light source.

4. The vehicle lamp according to claim 1, wherein the light guide output part includes a light guide emitting surface inclined obliquely with respect to an axial direction of the second light guide part to be parallel to an axial direction of the first light guide part.

5. The vehicle lamp according to claim 1, wherein the light guide output part includes a light guide emitting surface perpendicular with respect to the axial direction of the second light guide part.

6. The vehicle lamp according to claim 1, wherein the connecting part connects the back surface side of the first light guide part and the tip side of the second light guide part via a pair of connecting parts located on both sides across the opening part.

7. The vehicle lamp according to claim 6, wherein, among the light emitted from the light guide output part to the air layer, some light that has been reflected by the pair of connecting parts enters the first light guide part from the back surface side of the first light guide part which is across the opening part.

* * * * *